Nov. 12, 1935.  A. E. WILKINS  2,021,120
SEAT CONSTRUCTION
Filed June 29, 1931
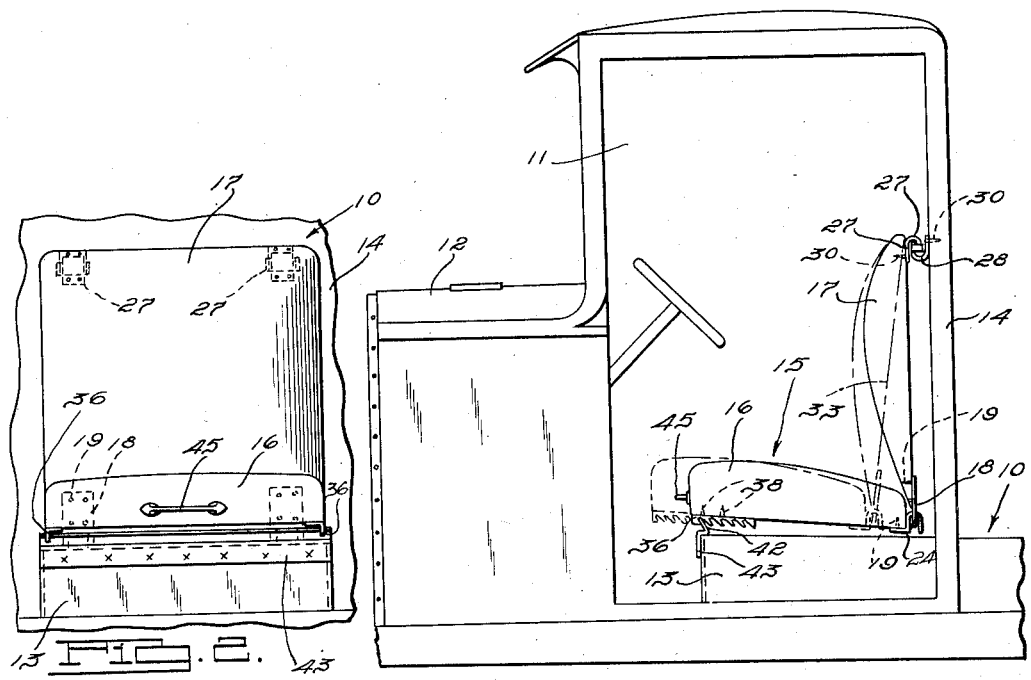
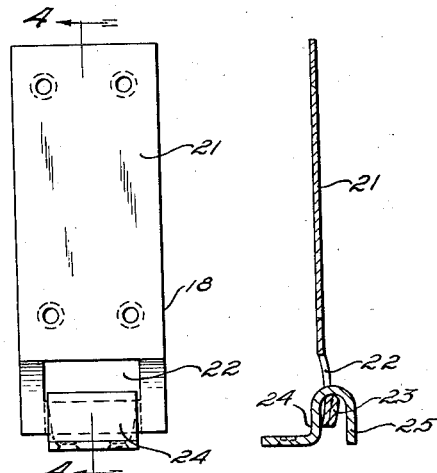
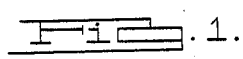
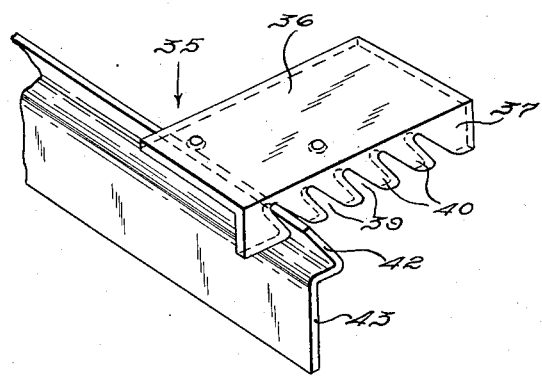
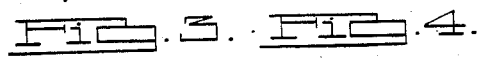
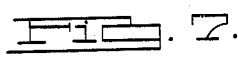
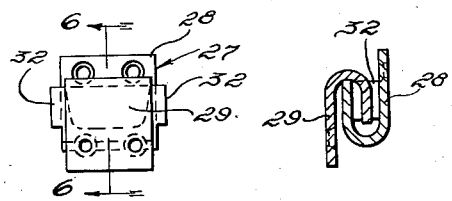
INVENTOR
Adelbert. E. Wilkins.
BY
Harness, Dickey, Pierce & Hamm
ATTORNEYS.

Patented Nov. 12, 1935

2,021,120

UNITED STATES PATENT OFFICE 2,021,120

SEAT CONSTRUCTION

Adelbert E. Wilkins, Lansing, Mich., assignor to Reo Motor Car Company, Lansing, Mich., a corporation of Michigan Application June 29, 1931, Serial No. 547,578

3 Claims. (Cl. 155—116)

This invention relates to vehicles and it has particular relation to the seat construction of a motor vehicle body.

The main objects of the invention are to provide a motor vehicle in which the driver's seat thereof is readily movable therein toward and from the steering wheel; to provide a seat for a motor vehicle body in which the angle of the back portion can be quickly varied at the will of the operator; to provide a seat the bottom portion of which is carried by the back portion, thus obviating the use of the leg or equivalent structure ordinarily employed adjacent the rear of the seat; to provide a novel means for adjusting the seat to various positions thus changing the angle at which the back portion of the seat is disposed with respect to the bottom portion; to provide a novel means for securing the seat to the motor vehicle body and to provide a seat of the type described that is efficient in operation and economical to manufacture.

The above being among the objects of the present invention, the same consists of certain features of construction and combination of parts to be hereinafter described with reference to the accompanying drawing and then claimed, having the above and other objects in view.

In the accompanying drawing which illustrates a suitable embodiment of the present invention, and in which like numerals refer to like parts throughout the several different views, Fig. 1 is a fragmentary elevational view of the invention disclosing a seat constructed and disposed in the cab portion of a motor truck.

Fig. 2 is a fragmentary front elevational view of the seat construction shown in Fig. 1.

Fig. 3 is a front elevational view of one form of a pivotal connection employed in connecting the back and bottom portions of the seat.

Fig. 4 is a sectional view of the connecting means disclosed in Fig. 3, taken substantially along line 4—4 of Fig. 3.

Fig. 5 is a front elevational view of a suspending means employed in the invention at the top of the seat back.

Fig. 6 is a sectional view of the suspending means taken substantially along line 6—6 of Fig. 5, and Fig. 7 is a perspective view of the latching means employed for controlling the position of the seat bottom in a forwardly and rearwardly direction, as well as controlling the angularity of the seat back.

In the broad aspects of the invention a seat is provided in which the back and bottom portions thereof are pivotally connected together adjacent the rear edge of the bottom portion in any suitable manner, and the seat is suspended for pivotal movement from a supporting member in the motor vehicle body, with the pivotal connection being disposed at a point vertically spaced with respect to the pivotal connection between the back and bottom portions. The seat back thus supports the rear edge of the seat bottom for movement about the pivotal support of the back, and supporting means are provided for the front end of the seat bottom to permit such movement. The seat thus suspended may be easily moved toward and from the steering wheel, thus changing the angle of the back portion of the seat and varying the distance of the seat bottom with respect to the steering wheel, thereby providing a seat that can be readily adjusted to meet the requirements of the individual drivers.

While the invention is applicable to any type of motor vehicle, it is particularly adapted for use in combination with a cab of a motor truck where the seat may be suspended and supported by the rear panel of the cab. The seat in such case may be provided with a slotted plate secured to the back portion of the seat and a bracket secured to the lower side of the bottom portion adjacent the rear edge thereof, said bracket terminating in a reversely bent portion adapted to be disposed through the slotted portion for pivotally connecting said portions together, and a pair of brackets disposed adjacent the top of the back portion between said portion and the rear supporting member of the cab which movably suspends the seat from the rear portion of the cab of the motor truck. To maintain the seat in the various positions desired, a latching means may be secured adjacent the front of the seat bottom with a portion thereof secured to any suitable means of support in the motor vehicle such as a seat riser.

When adapting the present invention to a motor truck, such as that disclosed in the drawing, a chassis 10, is provided with a cab portion 11 including a cowl 12. The cab 11 may be provided with a transversely disposed seat riser 13 and various types of additional means of support for the seat back, but I prefer to employ the vertically disposed rear portion of the cab as indicated at 14 for the sake of economy and efficiency, for movably supporting a seat 15 as will hereinafter be described. The seat 15 in such case includes a bottom portion 16 and a back portion 17, each preferably constructed of a frame member, a plurality of springs and padding (not shown) and formed in any well known or conventional manner. The portions 16 and 17 extend angularly with respect to each other, the back portion 17 extending upwardly in substantially a vertical plane with respect to the lower surface of the bottom portion 16. The portions 16 and 17 are pivotally connected adjacent the rear edge of the bottom portion by a plurality of hinge elements 18, portions of the elements being secured to the seat portion 16 and back portion 17 respectively by screws 19 threaded into such portions.

As shown in Figs. 3 and 4, each hinge element 18 may comprise a plate 21 secured to the rear face of the back portion 17, the plate being formed with a rectangular opening 22, with the material pressed out to form the opening, reversely bent as indicated at 23, to provide a suitable reinforced and wear resisting supporting surface for a bracket such as 24 secured to the lower surface of the bottom member 16. Each of the brackets 24 may extend beyond the rear of the bottom member 16 and there terminate in a downwardly opening U-shaped or reversely bent portion 25, adapted to extend through the opening 22 and thus swingably co-act with the member 18 to support the rear edge of the seat bottom. It may be noted that the portion 25 is readily disengaged from the plate 21.

The seat back 17, which is thus employed to support the rear end of the seat bottom 16, is in turn swingably supported adjacent its upper edge to the rear panel 14, or the usual framework therefor, of the cab 11, by a plurality of connections 27. As shown in Figs. 5 and 6, each of the connections 27 may be composed of a pair of opposed reversely bent, hook shaped or U-shaped readily disengageable bracket members 28 and 29, secured to the members 14 and 17 respectively by screws 30 threaded into the respective portions thereof. It will be noted that the downwardly opening member 29 secured to the back portion 17 interengages with the upwardly opening member 28, secured to the portions 14 to thus swingably support the seat 15 therefrom. If desired, each member 28 may be provided with a pair of rearwardly bent lugs 32 disposed at each end thereof, for limiting the horizontal movement of the member 29, thus maintaining the portion 29 in proper lateral engagement with the portion 28. It will be noted that in suspending the seat in the manner described the seat may be easily moved so that the back portion may assume various angles and the seat bottom may be moved either toward or from the steering wheel, as for example, the position of the seat, as indicated in dot-and-dish line at 33 of Fig. 1.

The seat 15 may be maintained in the desired angle by a latching means 35, which may assume various forms, but preferably the form shown in Fig. 7. As shown in Fig. 7, the latching means 35 may comprise a pair of plate members 36 secured to the lower surface of the bottom portion 16, said members being disposed on opposite sides of the bottom portion, with each of the plates 36 terminating in a downwardly extending flange 37. As shown in Fig. 2, the outer surface of the flange member 37 may be disposed in the vertical plane of the sides of the seat bottom 16 and plate member 36 may be rigidly secured to the seat bottom in any suitable manner, such as by screws 38 threaded in the bottom portion 16. The flange portion 37 may be provided with a plurality of notched portions 39 cut in any desired form but preferably in form, as shown in Fig. 7, so as to provide a plurality of teeth 40, the surfaces of which extend downwardly and rearwardly with respect to the seat, thus co-acting with, and engaging an upwardly and outwardly extending flange 42, on a plate 43, which may be carried by the usual seat riser 13. The plate 43 may be secured to the seat riser 13 in any suitable or conventional manner. It will be noted that the plate 36 rigidly secured to the seat member 16, co-acting with the plate 43 rigidly secured to the seat riser 13, not only provides a means for maintaining the portion of the seat 17 at various desired angles, but also provides a rigid support for the front of the seat 15. If desired, a handle 45 may be secured to the front of the portion 16 to facilitate the moving of the seat. It will be apparent that when the seat is occupied, the weight of the occupant insures maintenance of these parts in co-operative relation so as to hold any adjustment of the seat.

In operation the bottom member 16 and the back member 17 of the seat 15 are hinged together as described above, with the seat 15, being suspended from the rear of the cab 14 and the front of the seat being supported upon the seat riser 13, by the plates 36 and 43, with the flange member 42 disposed in one of the notches 39 of the flange portion 37. When a change in the position of the seat 15 is desired, it is only necessary for the operator or driver to grasp the handle 45, exert an upper movement upon the seat 15 until the flange 42 is removed from the notch in which it is engaged and move the seat 15 toward or from the steering wheel, to the position desired, after which the flange 42 may be again disposed in one of the notches 39 corresponding to the position of the seat.

From the foregoing description, it is apparent that I have provided a seat construction for motor vehicles which, cooperating with portions of the vehicle body, provides a seat which is readily moved forwardly or backwardly with respect to the steering wheel, and at the same time this movement varies the angle of the back portion, which has the effect of accentuating the movement of the seat bottom, to meet the requirements of the individual driver. Moreover, in providing a seat having the structural features and the combination of parts as described above, a seat is provided which is not only equally as durable as any of the seats or seat constructions heretofore employed, but a seat is provided that is more efficient in operation and considerably more economical in manufacture than the seats heretofore provided. Moreover, it will be apparent that the construction is such that not only may the two parts of the seat be readily engaged with or disengaged from each other, but the entire seat may be inserted in or removed from, in part or in whole, the vehicle body with a minimum amount of time and labor.

While I have shown in the drawing a particular illustrative embodiment of my invention, various modifications may be made in the same, and in the various features of construction, without materially changing the invention therein, and formal changes may be made in the specific embodiment of the invention described, without departing from the spirit or substance of the broad invention, the scope of which is commensurate with the appended claims.

I claim:

1. In combination with a motor vehicle body, a seat comprising back and bottom portions hinged together adjacent the rear edge of the bottom portion, a downwardly opening U-shaped member secured to the back portion adjacent the top thereof, a supporting surface in the vehicle, an upwardly opening U-shaped member secured thereto, said U-shaped members being readily disengageable and co-acting to pivotally suspend the rear portion of the seat, the second mentioned U-shaped member being provided with portions for limiting the horizontal lateral movement of the first mentioned member relative thereto, a seat riser in the vehicle disposed adjacent the front of the bottom portion, a plate secured to the riser adjacent the top thereof, said plate being provided with an upwardly and forwardly extending flange portion, and a second plate mounted on the lower side of the bottom portion and co-operating with the first mentioned plate to support the front end of said seat, said second plate being provided with a downwardly disposed flange having rearwardly and downwardly extending ratchet teeth therein, and said teeth co-acting with the flange portion of the first mentioned plate for varying the position of the seat.

2. Seat construction for automobiles and the like comprising a back support, a seat back, complementary means associated with the back support and the seat back near the tops thereof for hanging the seat back to said support such that it may be removed simply by lifting, a seat, means for supporting the forward portion of the seat, and complementary means associated with the lower end of the seat back and with the rearward portion of the seat for pivotally suspending the seat to the back such that the back may be released by simply lifting the seat.

3. Seat construction for automobiles and the like comprising a back support, a seat back, means for pivotally hanging the seat back from the back support such that it may be removed by simply lifting, seat, means for supporting the forward portion of the seat in a plurality of fixed positions and means for pivotally supporting the rearward portion of the seat from the seat back, said front and rear seat supporting means supporting said seat such that it may be removed from said seat supports and from said seat back by simply lifting it.

ADELBERT E. WILKINS.